United States Patent
Akama et al.

(10) Patent No.: US 11,137,729 B2
(45) Date of Patent: Oct. 5, 2021

(54) SYSTEMS AND METHODS FOR VEHICLE COMMUNICATION FOR REMOTE CONTROL

(71) Applicant: Honda Motor Co., Ltd., Tokyo (JP)

(72) Inventors: Shinichi Akama, Cupertino, CA (US); Shigeyuki Seko, Campbell, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 16/193,002

(22) Filed: Nov. 16, 2018

(65) Prior Publication Data

US 2020/0159176 A1    May 21, 2020

(51) Int. Cl.
| | |
|---|---|
| G05B 15/02 | (2006.01) |
| H04L 29/08 | (2006.01) |
| G01C 21/20 | (2006.01) |
| G05D 1/00 | (2006.01) |

(52) U.S. Cl.
CPC .......... *G05B 15/02* (2013.01); *G01C 21/20* (2013.01); *G05D 1/0088* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 8,412,381 B2* | 4/2013 | Nikovski | F24F 11/62 700/276 |
| 9,083,546 B2* | 7/2015 | Sadhu | A61B 5/0205 |
| 2015/0009010 A1* | 1/2015 | Biemer | G01G 19/44 340/5.83 |

FOREIGN PATENT DOCUMENTS

| | | |
|---|---|---|
| JP | H04-86564 | 7/1992 |
| JP | 2002183857 | 6/2002 |
| JP | 2003063357 | 3/2003 |

* cited by examiner

*Primary Examiner* — Carlos R Ortiz Rodriguez
(74) *Attorney, Agent, or Firm* — Rankin Hill & Clark LLP (57) ABSTRACT

The systems and methods described herein are generally directed to vehicle communication for remote control of communicating devices at a destination. According to one aspect, a computer-implemented method for vehicle communication for remote control is provided. The method includes selecting a destination based on user data associated with a user of a vehicle. The method also includes identifying one or more destination attributes associated with the destination. The method further includes detecting a trigger event based on vehicle data received from one or more of vehicle systems or vehicle sensors of the vehicle. In response to the trigger event being detected, instructions for controlling one or more remote systems at the destination are transmitted based on the one or more destination attributes.

20 Claims, 7 Drawing Sheets

SYSTEMS AND METHODS FOR VEHICLE COMMUNICATION FOR REMOTE CONTROL

BACKGROUND

Vehicles are increasingly capable of communicating with each other as well as with roadside devices and roadway sensors. For example, vehicles may communicate using a vehicular ad hoc network (VANET), a vehicle-to-vehicle (V2V) network, a vehicle-to-everything (V2X) network, and a vehicle-to-infrastructure (V2I) network, among others. However, when the vehicle arrives at a destination (e.g., home, office, coffee shop, etc.), the vehicle is unable to communicate with devices at the destination. Instead, the communication between the communicating devices occurs over a network specific to the destination. For example, the destination network may be a local area network (LAN), a wide area network (WAN), and a personal area network (PAN), among others. Thus, vehicles do not typically communicate with the devices of the living area. Accordingly, neither vehicles nor the communicating devices of the living area can fully accommodate the transition of the user between the vehicle and the destination.

BRIEF DESCRIPTION

According to one aspect, a computer-implemented method for vehicle communication for remote control is provided. The method includes selecting a destination based on user data associated with a user of a vehicle. The method also includes identifying one or more destination attributes associated with the destination. The method further includes detecting a trigger event based on vehicle data received from one or more of the vehicle systems or vehicle sensors of the vehicle. In response to the trigger event being detected, instructions for controlling one or more remote systems at the destination are transmitted based on the one or more destination attributes.

According to another aspect, a system for vehicle communication for remote control includes a destination module, an environmental module, a trigger event module, and a control module. The destination module selects a first destination and a second destination based on user data associated with a user of a vehicle. The environmental module identifies a first set of destination attributes associated with the first destination and a second set of destination attributes associated with the second destination. The trigger event module detects a trigger event based on vehicle data received from one or more of the vehicle systems or vehicle sensors of the vehicle. The control module transmits a first set of instructions for controlling one or more remote systems at the first destination based on the first set of destination attributes at a first time in response to the trigger event. The control module also transmits a second set of instructions for controlling one or more remote systems at the second destination based on the second set of destination attributes at a second time after the first time.

According to a further aspect, a non-transitory computer-readable storage medium stores instructions that, when executed by a computer, cause the computer to perform a method. The method includes selecting a first destination and a second destination based on user data associated with a user of a vehicle. The method also includes identifying a first set of destination attributes associated with the first destination and a second set of destination attributes associated with the second destination. The method further includes detecting a trigger event based on vehicle data received from one or more of the vehicle systems or vehicle sensors of the vehicle. In response to the trigger event being detected, a first set of instructions for controlling one or more remote systems at the first destination based on the first set of destination attributes are transmitted at a first time. The method also includes transmitting a second set of instructions for controlling one or more remote systems at the second destination based on the second set of destination attributes at a second time after the first time.

DETAILED DESCRIPTION

Generally, the systems and methods disclosed herein are directed to vehicle communication to provide remote control of devices at one or more destinations. User data regarding a user in the vehicle is used to select a destination. For example, user data associated with the user may include user input, historical data, user patterns, and trend analysis. The destination is associated with destination attributes. The destination attributes may include environmental settings such as lighting settings, audio settings, etc. that reflect the user's preferences for the destination. In response to a trigger event being detected, instructions for controlling one or more remote systems at the destination are transmitted according to the one or more destination attributes. An example trigger event may be a door of the vehicle being opened. Accordingly, when a user opens the door of a vehicle the devices at the destination may be controlled according to the user preferences.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wide-band (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"User," as used herein can include, but is not limited to, one or more biological beings such as an adult, a child, or an infant.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Figure 1:
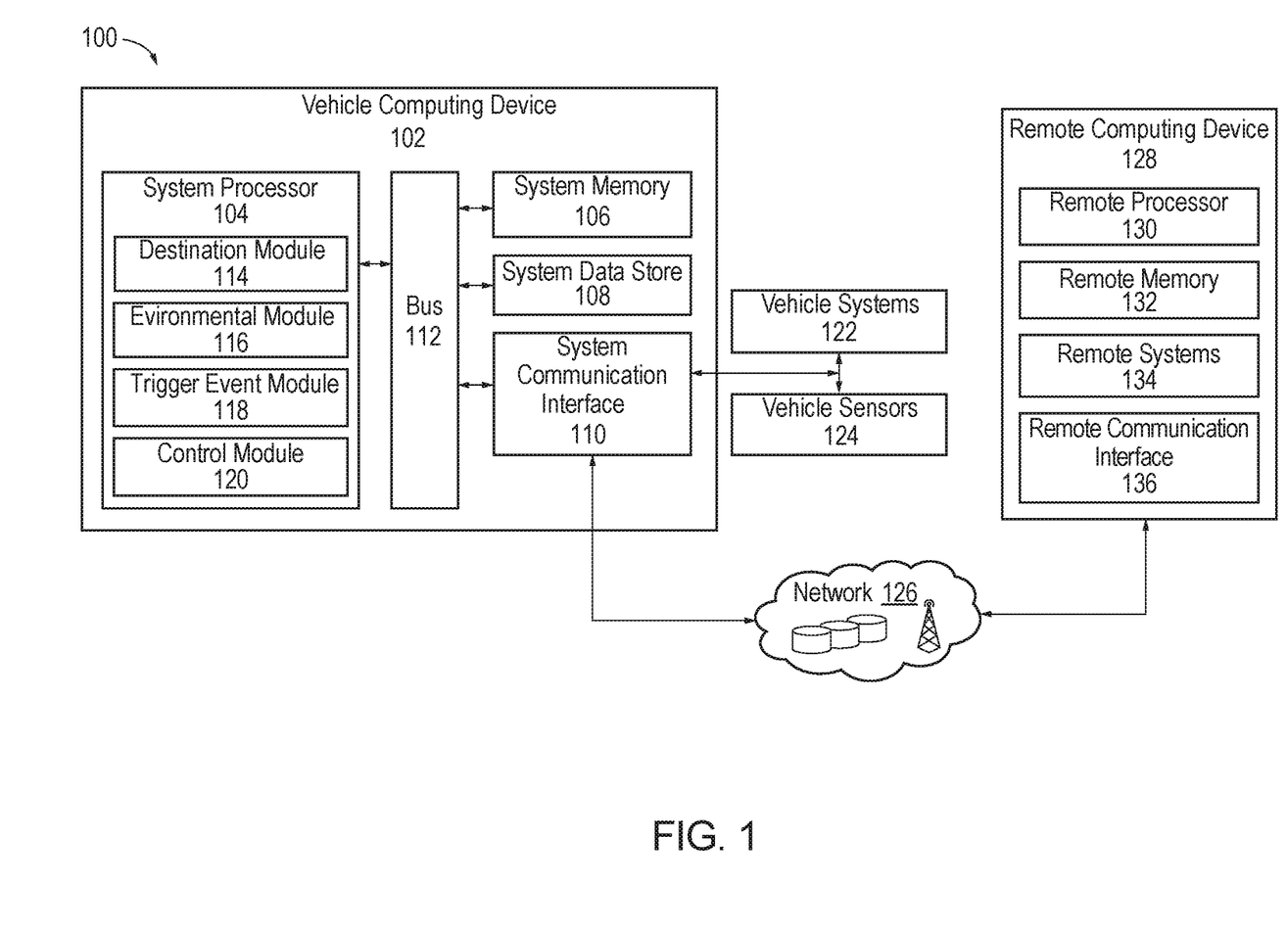
FIG. 1 is a schematic diagram of an operating environment for implementing systems and methods for vehicle communication for remote control according to an exemplary embodiment.
Figure 2:
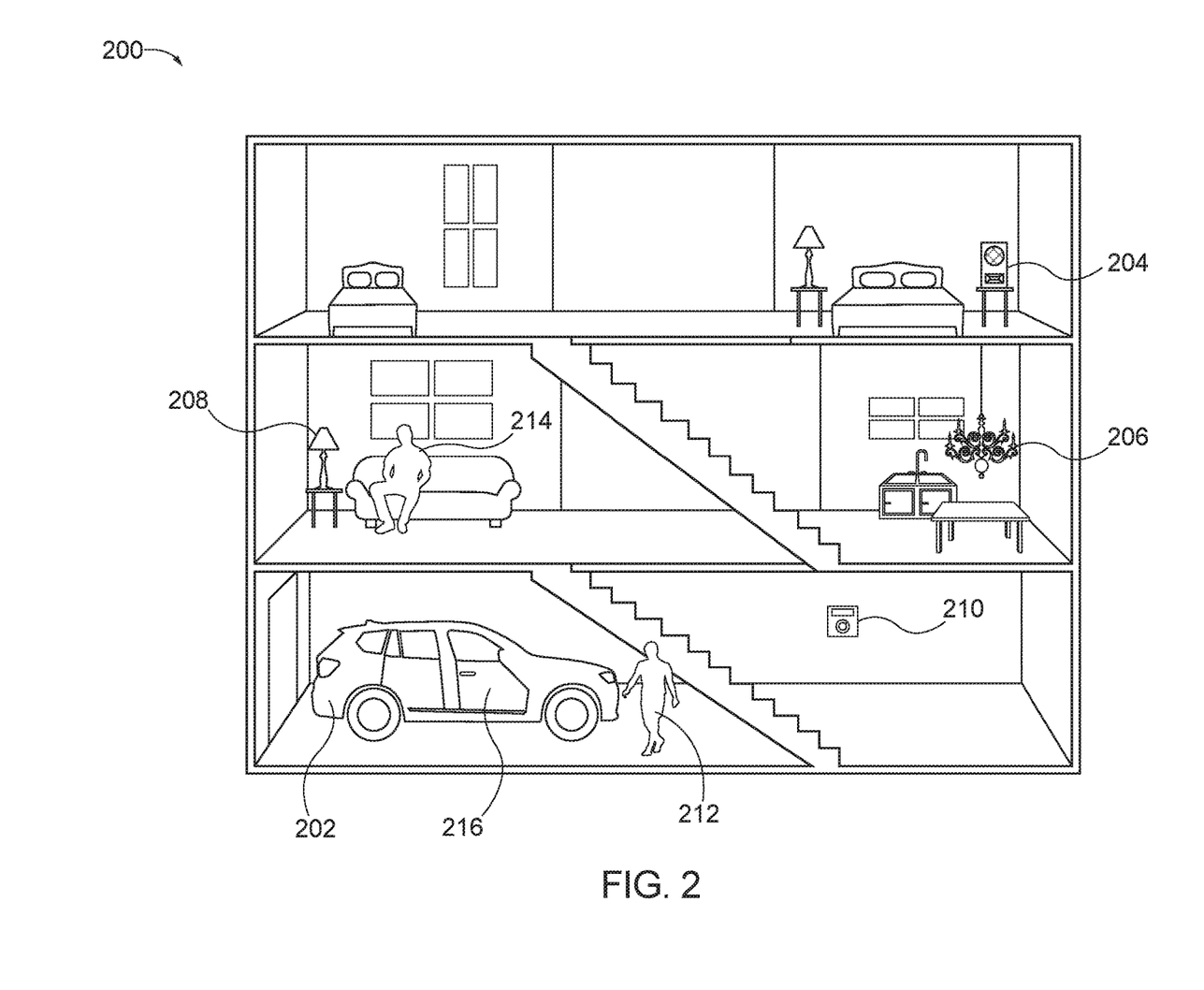
FIG. 2 is a schematic diagram of a residence with vehicle communication for remote control according to an exemplary embodiment.

Referring now to the drawings, wherein the showings are for purposes of illustrating one or more exemplary embodiments and not for purposes of limiting same, FIG. 1 is a schematic diagram of an operating environment 100 for implementing systems and methods for vehicle communication for remote control. The components of operating environment 100, as well as the components of other systems, hardware architectures, and software architectures discussed herein, can be combined, omitted, or organized into different architectures for various embodiments. Furthermore, the components of the operating environment 100 can be implemented with or associated with a vehicle. For example, FIG. 2 is a schematic diagram of a residence 200 and a vehicle 202 capable of using vehicle communication to control devices in the residence 200 according to an exemplary embodiment.

In the illustrated embodiment of FIG. 1, the operating environment 100 includes a vehicle computing device (VCD) 102 with provisions for processing, communicating and interacting with various components of a vehicle and other components of the operating environment 100. In one embodiment, the VCD 102 can be implemented with the vehicle 202 (shown in FIG. 2), for example, as part of a telematics unit, a head unit, a navigation unit, an infotainment unit, an electronic control unit, among others. In other embodiments, the components and functions of the VCD 102 can be implemented remotely from the vehicle 202, for example, with a portable device (not shown) or another device connected via a network (e.g., a network 126).

Generally, the VCD 102 includes a system processor 104, a system memory 106, a system data store 108, and a system communication interface 110, which are each operably connected for computer communication via a bus 112 and/or other wired and wireless technologies. The system communication interface 110 provides software and hardware to facilitate data input and output between the components of the VCD 102 and other components, networks, and data sources, which will be described herein. Additionally, the system processor 104 includes a destination module 114, an environmental module 116, a trigger event module 118, and a control module 120, each suitable for providing vehicle communication for remote control of devices at a destination facilitated by the components of the operating environment 100.

Figure 3:
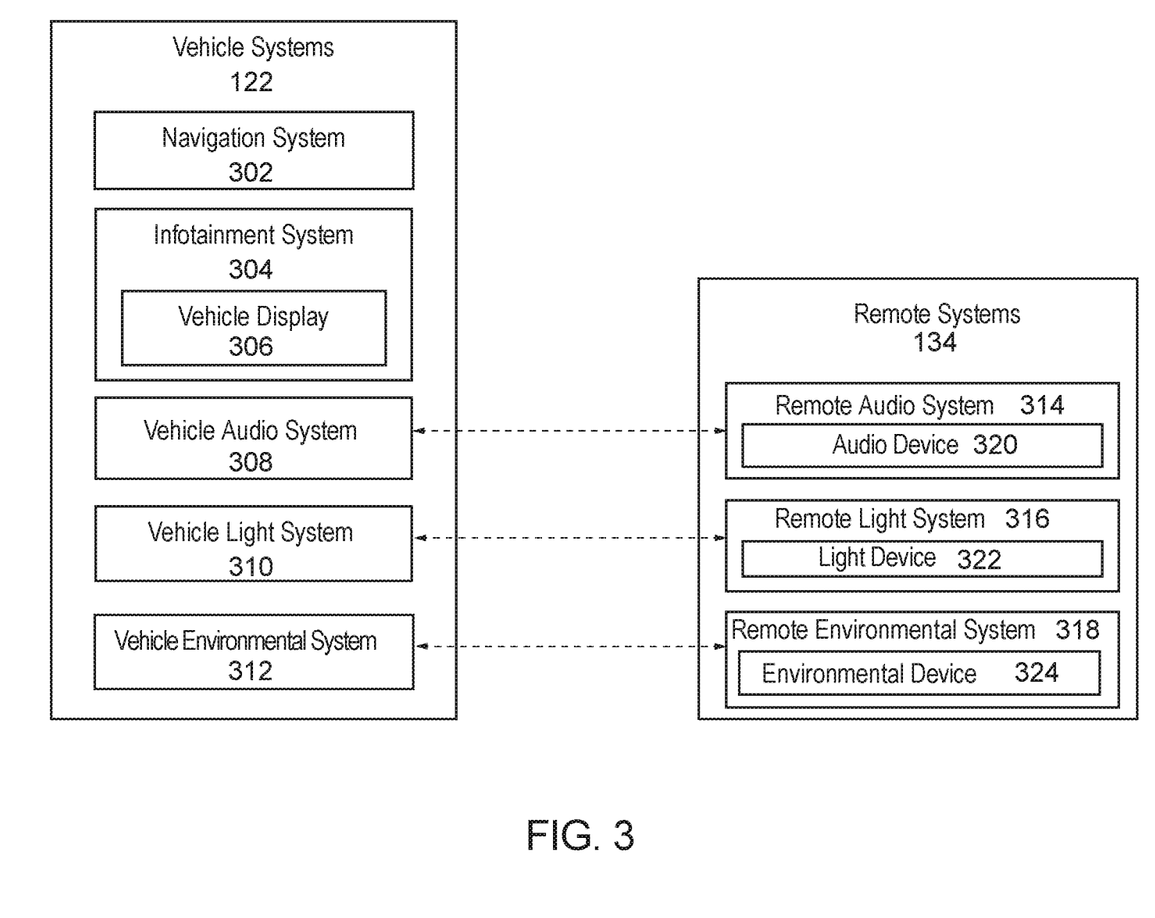
FIG. 3 is a schematic diagram of exemplary vehicle systems and remote systems according to an exemplary embodiment.

The VCD 102 is also operably connected for computer communication (e.g., via the system communication interface 110 and/or the bus 112) to one or more vehicle systems 122. The vehicle systems 122 can include, but are not limited to, any automatic or manual systems that can be used to enhance the vehicle, driving, and/or safety. FIG. 3 illustrates various different vehicle systems 122 according to an exemplary embodiment. The vehicle systems shown in FIG. 3 are exemplary in nature and other vehicle systems can be implemented with the systems and methods discussed herein. In the embodiment shown in FIG. 3, the vehicle systems 122 can include a navigation system 302, an infotainment system 304 having a vehicle display 306, a vehicle audio system 308, a vehicle light system 310, and vehicle environmental system 312.

The vehicle audio system 308 controls audio (e.g., audio content, volume) in the vehicle. The vehicle light system 310 controls interior lighting such as cabin lighting as well as exterior lights. The exterior lights may include vehicle headlight and turn signal control for controlling lighting (e.g., head lights, flood lights) and signaling devices (e.g., turn signals, blind spot indicators) mounted on various locations of the vehicle 202, for example, front, side, rear, the top of the vehicle 202, the side mirrors, among others. The vehicle environmental system 312 controls the environmental settings, such as a vehicle thermostat, a vehicle air conditioning, a vehicle heat, vehicle fans, and a vehicle defroster, among others.

Referring again to FIG. 1, the vehicle systems 122 include and/or are operably connected for computer communication to various vehicle sensors 124. The vehicle sensors 124 provide and/or sense information associated with one or more users, the vehicle 202, the vehicle environment, and/or the vehicle systems 122. The vehicle sensors 124 can include, but are not limited to, vehicle sensors 124 associated with the vehicle systems 122 and other vehicle sensors associated with the vehicle 202. The vehicle sensors 124 can include, but are not limited to, vehicle speed sensors, door sensors, accelerator pedal sensors, brake sensors, throttle position sensors, wheel sensors, anti-lock brake sensors, camshaft sensors, and physiological sensors (e.g., monitoring sensors, heart rate sensors, blood pressure sensors, oxygen content sensors, respiratory sensors, perspiration sensors, imaging sensors to sense eye movement, etc.), among others.

The vehicle sensors 124 can also include, but are not limited to, cameras mounted to the interior or exterior of the vehicle 202 and radar and laser sensors mounted to the exterior of the vehicle 202. Further, the vehicle sensors 124 can include sensors external to the vehicle 202 (accessed, for example, via the network 126), such as external cameras, radar and laser based sensors on other vehicles in a vehicle-to-vehicle network, street cameras, surveillance cameras, and roadway sensors, among others.

The vehicle sensors 124 are operable to sense a measurement of data associated with the vehicle 202, the vehicle environment, the vehicle systems 122, and/or users of the vehicle, and generate a data signal indicating said measurement of data. These data signals can be converted into other data formats (e.g., numerical) and/or used by the vehicle systems 122 and/or the VCD 102 to generate other data metrics and parameters. The vehicle sensors 124 can be any type of sensor, for example, acoustic, electric, environmental, biomedical, optical, imaging, light, pressure, force, thermal, temperature, proximity, among others.

The VCD 102 is also operatively connected for computer communication to the network 126 to at least one remote computing device 128. Generally, the remote computing device 128 includes a remote processor 130, a remote memory 132, remote systems 134, and a remote communication interface 136, which are each operably connected for computer communication. The connection from the system communication interface 110 to the network 126 and the remote computing device 128 can be facilitated in various ways. For example, the connection may be made through a network connection (e.g., wired or wireless), a cellular data network from a portable device (not shown) or the remote computing device 128, a vehicle to vehicle ad-hoc network (not shown), an in-vehicle network (not shown), among others, or any combination of thereof.

The network 126 is, for example, a data network, the Internet, a wide area network or a local area network. The network 126 serves as a communication medium to various remote devices (e.g., databases, web servers, remote servers, application servers, intermediary servers, client machines, other portable devices). In some embodiments, the one or more communicating devices can be included in the network 126, accessed by the VCD 102 through the network 126, and/or the network 126 can access the one or more communicating devices. Thus, in some embodiments, the VCD 102 can obtain data from the one or more communicating devices via the network 126.

The remote computing device 128 may generally provide control data to the VCD 102 and receive control data from the VCD 102. The control data may include operational information about the vehicle 202 or one or more remote systems 134, the user, or the remote computing device 128. Turning back to FIG. 3, various different remote systems 134 are illustrated according to an exemplary embodiment. The remote systems 134 shown in FIG. 3 are exemplary in nature and other remote systems can be implemented with the systems and methods discussed herein. In particular, the remote systems 134 are associated with one or more communicating devices at the destinations, such as the residence 200 shown in FIG. 2 or the office 500 shown in FIG. 5. A destination may be any area where users are that have communicating devices capable of communicating. For example, a destination may be places where users live, work, play and congregate that have communicating devices.

In the embodiment shown in FIG. 3, the remote systems 134 can include a remote audio system 314, a remote light system 316, and remote environmental system 318. The remote audio system 314 controls audio (e.g., audio content, volume) at the destination. The remote audio system 314 includes an audio device 320. The audio device 320 can be any audio device capable of computer communication to control audio, such as a smart speaker, a Bluetooth® speaker, and an audiovisual system, among others. For example, as shown in FIG. 2, the audio device 320 may be a speaker 204.

The remote light system 316 controls lighting settings within the destination and the lighting around the destination such as such as exterior lights. The remote light system 316 includes a light device 322. The light device 322 can be any lighting device capable of computer communication, such as smart lights, daylight sensing lights, occupancy sensing lights, ultrasonic lights, smart switches, smart plugs, and smart outlets, among others. For example, as shown in FIG. 2, the light device 322 may be a chandelier 206 and/or a lamp 208.

The remote environmental system 318 controls the environment of the destination, such as temperature, humidity, daylight, air quality, water quality, etc. The remote environmental system 318 includes an environmental device 324. The environmental device 324 can be any environmental device capable of computer communication, for example, a thermostat, a heating ventilation and air conditioning (HVAC) system, an air quality monitor, power window treatments (e.g., power blinds, power shades, etc.), a humidifier, and dehumidifier, among others. For example, as shown in FIG. 2, the environmental device 324 may be a thermostat 210.

The audio device 320, the light device 322, and the environmental device 324 may communicate through the remote audio system 314, the remote light system 316, and the remote environmental system 318, respectively. As discussed above, the remote systems 134 communicate with the VCD 102 using the remote communication interface 136. Accordingly, the VCD 102 of the vehicle 202 is able to communicate with the audio device 320, the light device 322, and the environmental device 324. In some embodiments, the remote computing device 128 could also include a portable device (e.g., a mobile device, tablet, smart phone, etc.).

The systems and methods disclosed herein can include any number of vehicle systems 122, remote systems 134, and associated communication devices. Further, in some embodiments, the communicating devices can include a device identifier, which can be transmitted to the VCD 102 and used by the VCD 102 to individually identify the communicating devices. As described above, the communicating devices including the audio device 320, the light device 322, and the environmental device 324 may be any device capable of computer communication so that the communicating devices can be remotely controlled by the VCD 102.

The operating environment 100 shown in FIG. 1 will now be described in operation according to an exemplary embodiment with reference to FIG. 2. As mentioned above, and as shown in detail in FIG. 2, the destination may be a residence 200. The residence 200 is shown with several rooms, however, the residence 200 can have more or fewer rooms in various configurations not shown in FIG. 2. Furthermore, the contents, design, and arrangement of the rooms may be different configurations than that shown in the residence 200.

Returning to FIG. 1, the VCD 102 includes a system processor 104 having the destination module 114, the environmental module 116, the trigger event module 118, and the control module 120. The destination module 114 selects one or more destinations for communication based on the user data of a user 212. The user data is information about the user 212, and may include, for example, schedule data, calendar data, tracking data, interaction data, historical data, health data, and user input, among others. The user data may also include analysis of one or more types of the user data. For example, the user data may include user patterns and trend analysis based on the past scheduling and the behavior of the user 212.

The user data may also include vehicle sensor data from the vehicle sensors 124. For example, the vehicle sensors 124 may sense when the user 212 is in the vehicle 202 and collect data regarding destinations and with whom the user 212 communicates. For example, the vehicle sensors 124 may identify the user 212 with physiological data, such as weight, height, seat position, and heart rate pattern, among others. The vehicle systems 122 can identify user data, such as the one or more destinations the user 212 travels to, when the user 212 travels to the one or more destinations, with whom the user 212 communicates, and other habits of the user 212. The VCD 102 may then store user data about the user 212 in the system memory 106 or the system data store 108.

For example, suppose that over the course of several weeks, the vehicle sensors 124 detect that the user 212 is typically in the vehicle for an average of 30 minutes between 4:30 pm to 6:30 pm. The vehicle systems 122 may determine that the user 212 is traveling home. For example, the navigation system 302 may identify an origin, such as an office 500, shown in FIG. 5, and a destination, such as the residence 200, shown in FIG. 2. This user data may be stored by the vehicle systems 122 and the vehicle sensors 124. The destination module 114 uses the user data to predict that on weekday evenings the user 212 travels to the residence 200 between 4:30 pm and 6:30 pm. Accordingly, the destination module 114 may select the residence 200 as the destination based on the prediction when the user 212 is in the vehicle between the hours of 4:30 pm to 6:30 pm on a weekday.

In some embodiments, the destination module 114 may identify a plurality of candidate destinations before selecting a destination. For example, the destination module 114 may identify a first candidate destination and a second candidate destination as candidate destinations. The destination module 114 assigns the at least one of the candidate destinations a probability score. A probability score is the statistical likelihood that the candidate destination is the destination that the user 212 will travel to. The statistical likelihood may be based on the historical data, user patterns, and trend analysis (e.g., regression analysis, statistical modelling, etc.), among others. For example, the first candidate destination may be given an 85% probability score and the second candidate destination may be given a 15% probability score. Accordingly, the destination module 114 may select the first candidate destination as the destination.

In addition to the destination being a place or living area, such as the residence 200, the destination may be associated with a person, such as an inhabitant 214 of a destination, as shown in FIG. 2. The inhabitant 214 may be anyone currently located at the destination. For example, the inhabitant 214 may be a relative (e.g., parent, child, sibling, grandparent, cousin, etc.), guardian, friend, employee, colleague, or service provider (e.g., nurse, janitor, cleaner, aide, nanny, babysitter, etc.), among others. Considering the example from above, rather than the first candidate destination and the second candidate destination, the destination module 114 may identify a first candidate inhabitant and a second candidate inhabitant based on the likelihood that the user 212 will attempt to contact an inhabitant at a destination while driving to the residence 200 on weekday evenings. The destination module 114 may then select a destination, for example the residence 200, associated with the inhabitant 214.

Once the destination module 114 selects a destination, the environmental module 116 identifies one or more destination attributes associated with the destination. The destination attributes identify settings that can be put into effect using the remote computing device 128 including the remote systems 134 associated with the communicating devices. Accordingly, the destination attributes have settings that reflect the preferences of the user 212. For example, the destination attributes may include lighting settings, audio settings, visual settings, appliance settings, temperature settings, and environmental settings, among others.

For example, suppose that when the user 212 enters the residence 200, the user 212 desires that John Coltrane's jazz be playing on the speaker 204, that the chandelier 206 be set to 50% white light, and that the thermostat 210 set the temperature to 68° Fahrenheit. When the destination module 114 selects the residence 200 as the destination, the environmental module 116 identifies one or more destination attributes associated with the residence 200, such as, an audio setting that the speaker 204 play John Coltrane's jazz, a light setting that the chandelier 206 be set to 50% white light, and a temperature setting that the thermostat 210 be set to 68° Fahrenheit.

In another embodiment, multiple communicating devices may be associated with a single destination attribute. For example, the destination attribute may indicate that all light devices be set to 50% white light. Continuing the example from above, the destination attribute would include settings for both the chandelier 206 and the lamp 208. Furthermore, a single communicating device may be associated with multiple destination attributes. For example, the destination attribute may indicate that the speaker 204 play John Coltrane's jazz and that the volume of the speaker be set at a predetermined level.

Referring again to FIG. 1, the trigger event module 118 detects a trigger event based on vehicle data from the vehicle system 122 and/or the vehicle sensors 124 of the vehicle 202. For example, the trigger event may be indicative of the user 212 entering or exiting the vehicle 202, such as the vehicle sensors 124 detecting that a vehicle door 216 being opened or closed. Alternatively, the trigger event may be activation of the ignition system, buckling of a driver seatbelt, the vehicle 202 entering a predetermined driving mode (e.g., autonomous driving mode, semi-autonomous mode, etc.), or user input, for example, input at the vehicle display 306.

In another embodiment, the trigger event may be based on vehicle data as well as user data. For example, to avoid a false positive detection of the trigger event, the trigger event module 118 may define the trigger event as the vehicle door 216 being opened and a weight of over 25 kilograms being detected in the driver seat of the vehicle 202. Alternatively, the trigger event may be user specific. For example, the vehicle sensors 124 may detect the identity of the user 212 by comparing sensed physiological data to normative or baseline data.

The trigger event may also be based on proximity to the destination selected by the destination module 114. For example, the navigation system 302 may generate navigation data regarding the proximity of vehicle 202 to the selected destination. The trigger event module 118 can compare the navigation data to a predetermined threshold distance, such as a specific radius from the destination. The trigger event module 118 would detect the vehicle 202 being within the predetermined threshold distance of the destination as a trigger event.

In response to the trigger event module 118 detecting a trigger event, the control module 120 transmits instructions for controlling one or more remote systems at the destination based on the one or more destination attributes. The instructions are transmitted to the remote computing device 128 and/or the corresponding remote system 134 for controlling an associated communicating device. For example, suppose the destination module 114 has selected the residence 200 as the destination and the trigger event module 118 defines the trigger event as the vehicle door 216 being opened. When the user 212 opens the vehicle door 216 of the vehicle 202, the control module 120 transmits instructions to control the communicating devices according to the destination attributes associated with the residence 200.

Continuing the example from above, suppose the destination attributes associated with the residence 200 include settings that John Coltrane's jazz be playing on the speaker 204, settings that the chandelier 206 be set to 50% white light, and settings that the thermostat 210 set the temperature to 68° Fahrenheit. The instructions transmitted by the control module 120 would transmit instructions to the remote computing device 128 to cause the settings of the destination attributes to take effect on the associated communicating devices. For example, an instruction may be transmitted through the remote computing device 128 to the remote audio system 314 to cause the speaker 204 to be activated, selecting jazz music associated with John Coltrane, and initiating the speaker 204 to play the selected jazz music. The instructions may also include other aspects of controlling the communicating devices, for example, controlling the volume, equalizer controls, and/or frequencies of the speaker 204.

Although described in sequence, two or more of the destination module 114, the environmental module 116, the trigger event module 118, and the control module 120 may operate concurrently and/or in a different sequence. For example, the trigger event module 118 may detect the trigger event, which causes the destination module 114 to select a destination. In another embodiment, the control module 120 may transmit instructions in response to the environmental module 116 identifying one or more destination attributes. Furthermore, the environmental module 116 may identify one or more destination attributes and the trigger event module 118 may detect the trigger event concurrently.

As another illustrative example, the environmental module 116 may identify destination attributes based on the vehicle systems 122. For example, the user 212 may prefer to continue the experience from the vehicle 202 to the residence 200. The trigger event may be defined as the vehicle 202 being placed in park and then the vehicle door 216 opening to indicate that the user 212 is exiting the vehicle 202. The environmental module 116 may access the vehicle systems 122 and or the vehicle sensors 124 for destination attributes. For example, the environmental module 116 may identify the setting of the vehicle audio system 308 as destination attributes corresponding to the remote audio system 314.

Suppose that the user 212 is listening to a playlist through the vehicle audio system 308 in the vehicle 202. The environmental module 116 may identify a setting to play the playlist as a destination attribute. Furthermore, the environmental module 116 may further use settings of the vehicle audio system 308 as destination attributes, such as controlling the volume, equalizer controls, and/or frequencies. In another embodiment, the user 212 may have set the vehicle environmental system 312 to a specific temperature, the environmental module 116 may identify the settings of the vehicle environmental system 312 as a destination attribute, such that a similar setting is identified for the remote environmental system 318. In yet another example, when the vehicle light system 310 has the headlights illuminated, the environmental module 116 may generate a destination attribute for the remote light system 316 to illuminate light devices such as the light device 322. Thus, the environmental module 116 may generate environmental attributes based on the vehicle systems 122 and/or the vehicle sensors 124. Accordingly, remote control of the communicating devices can be determined based on the operation of analogous vehicle system 122 and/or vehicle sensors 124 of the vehicle 202.

II. Methods for Providing Remote Control

Figure 4:
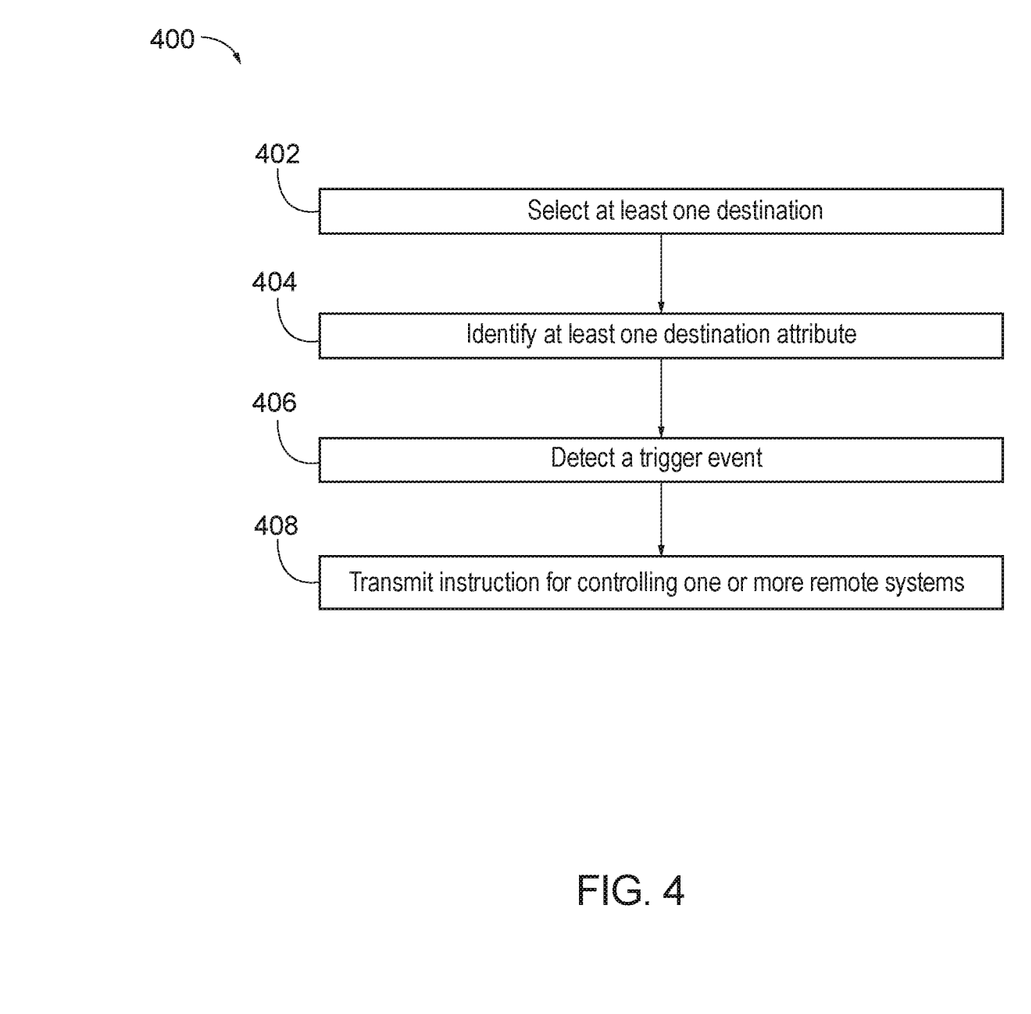
FIG. 4 is a process flow diagram of a method for vehicle communication for remote control according to an exemplary embodiment.

Referring now to FIG. 4, a method 400 associated with vehicle communication for remote control will be described according to an exemplary embodiment. FIG. 4 will be described with reference to FIGS. 1, 2, and 5. The illustrative examples discussed herein are exemplary in nature and varying vehicles, destinations, and destination attributes may be implemented.

With reference to FIG. 4, at block 402 the method 400 includes selecting at least one destination. As described above, a single destination may be selected such as the residence 200 shown in FIG. 2, or multiple destinations may be selected, for example, the residence 200 and the office 500 shown in FIG. 5. Thus, in one embodiment, a first destination and a second destination can be selected based on the user data and/or vehicle data.

Figure 5:
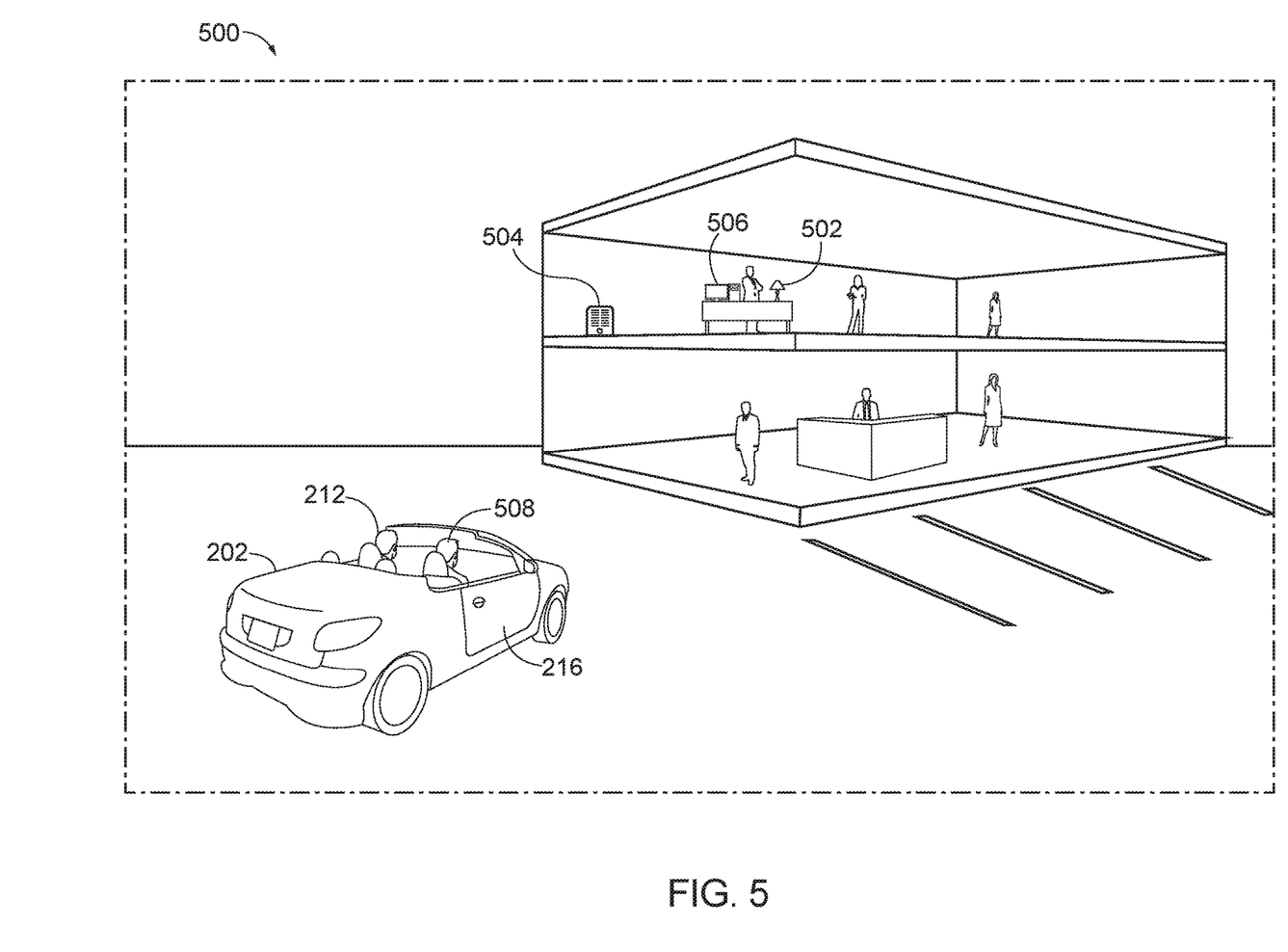
FIG. 5 is a schematic diagram of an office with vehicle communication for remote control according to an exemplary embodiment.

For example, the destination may be selected based on the proximity of the vehicle 202 to a destination. Suppose, the trigger event is opening the vehicle door 216 of the vehicle 202 and the destination module 114 selects the destination based on the trigger event being detected by the trigger event module 118. If the user 212 opens the vehicle door 216, the destination module 114 will determine the closest destination. The destination module 114 may make the selection based on historical data such that the destination module 114 determines the destinations that are the closest to the user 212. For example, historical data from GPS enabled communicating devices including portable devices of the user 212 may be used to determine the nearest destination. Alternatively, the vehicle systems 122 and the vehicle sensors 124 may be used to select the nearest destination to the vehicle 202. For example, the destination module 114 may access the navigation system 302, shown in FIG. 3, to determine the last known location of the vehicle 202 and to select the destination. Suppose the user 212 opens the vehicle door 216 in a parking lot of the office 500. The office 500 may be selected as the first destination based on the proximity of the parking lot to the office 500.

Additionally, based on the first destination being selected, the destination module 114 may also pick a second destination based on user data and/or vehicle data. For example, based on the historical data, user patterns, and statistical trends that indicate that the user 212 typically travels from the office 500 to the residence 200, the destination module 114 may select the residence 200 as the second destination. Accordingly, the second destination may be selected based on the first destination.

At block 404 the method 400 includes identifying at least one destination attribute associated with the selected destination. In an embodiment having more than one destination, at least one destination attribute may be identified for each destination. For example, the environmental module 116 may identify a first set of destination attributes associated with the first destination and a second set of destination attributes associated with the second destination.

Suppose that the first destination is the office 500, shown in FIG. 5, and that the second destination is the residence 200, shown in FIG. 2. The office 500 includes communicating devices that operate in a similar manner as described above with respect to the communicating devices of the residence 200. For example, suppose the office includes an office light 502, a space heater 504, and a computer 506. The office light 502 may be a light device 322 and thus correspond to a remote light system 316. Thus, the office light 502 functions in a similar way as described above with respect to the chandelier 206 or the lamp 208 of the residence 200 using the remote light system 316. For clarity, a single remote computing device as the remote computing device 128 is illustrated in the operating environment 100 with respect to the VCD 102, however, the VCD 102 may communicate with a plurality of remote computing devices, like the remote computing device 128 over a plurality of networks, such as network 126.

The first set of destination attributes may include settings for a light device 322, such as the office light 502, and an environmental device 324, such as the space heater 504. The user data may indicate that in the evenings the user 212 would like the office light 502 and the space heater 504 to be deactivated. Accordingly, the first set of destination attributes associated with the office 500 would include deactivation settings for the office light 502 and the space heater 504.

Additionally or alternatively, the first set of destination attributes may include receiving destination attributes from the communicating devices of the office 500. In one embodiment the computer 506 is able to exert control over the remote audio system 314, the remote light system 316, and the remote environmental system 318. Accordingly, the computer 506 may act as an audio device 320, a light device 322, and/or an environmental device 324. The environmental module 116 may query the computer 506 for settings that can be used to identify destination attributes for the first set of destination attributes. For example, the environmental module 116 may generate a query for the computer 506 to determine if the user 212 was listening to audio before the trigger event was detected. In one embodiment, the query may include a trigger window that includes a range of time such that the query request destination attributes based on the activity of the user in a specific range of time before the trigger event was detected. Suppose the user 212 was listening to a podcast ten minutes before the trigger event was detected. If the trigger window includes the activities of the user 212 ten minutes before the trigger event is detected, then the environmental module 116 may identify playing the podcast as a destination attribute, so that the podcast can be played in the vehicle 202 and/or at the second destination.

The second set of destination attributes may be identified concurrently with, before, or after the first set of destination are identified. The second set of attributes is associated with the second destination but may also include communicating devices such as the audio device 320, the light device 322, and the environmental device 324. For as example, the second set of destination attributes associated with the residence 200 may include settings that the podcast be playing on the speaker 204, settings that the chandelier 206 be set to 50% white light, and settings that the thermostat 210 set the temperature to the temperature of the vehicle 202.

At block 406 the method 400 includes detecting a trigger event based on vehicle data received from one or more of the vehicle systems 122 or vehicle sensors 124 of the vehicle 202. As discussed above, detecting the trigger event may happen in a different sequence and/or concurrently with other steps, such as before the destination being selected by the destination module 114 determines a destination. In some embodiments, the trigger event may be detected before, the at least one destination is determined or the destination attributes are identified.

At block 408 the method includes transmitting instructions based on the destination attributes associated with the at least one destination. For example, the control module 120 may transmit a first set of instructions for controlling one or more remote systems at the first destination corresponding to the first set of destination attributes. The control module 120 may also transmit a second set of instructions for controlling one or more remote systems at the second destination corresponding to the second set of destination attributes. As discussed above, the instructions are transmitted to the remote computing device 128 associated with the destination that corresponds to the remote systems 134 associated with the communicating devices.

In some embodiments, there may be one or more trigger events corresponding to the one or more sets of instructions. Accordingly, the instructions may be sent when the corresponding trigger event is detected. In another embodiment, the one or more sets of instructions may be associated with a single trigger event. Accordingly, the one or more sets of instructions may be transmitted simultaneously or at distinct times, such as a first time and a second time. Suppose the first time is approximately simultaneous with the trigger event, and the second time occurs when the vehicle 202 traverses a threshold distance from the second destination, when the vehicle enters an autonomous driving mode, and/or a predetermined amount of time after the first time. Continuing the example from above, the first set of instructions may be transmitted directly following the trigger event such that the office light 502 and the space heater 504 are deactivated in response to the trigger event being detected. Here, the first set of instructions would be sent to the remote computing device 128 that is associated with the office 500. The second set of instructions may be sent to a remote computing device that operates in a similar manner as the remote computing device 128. Accordingly, the first set of instructions and the second set of instructions may be sent to the same remote computing device or different remote computing devices.

The second set of instructions may not be transmitted until the vehicle 202 is closer to the second destination, which may save energy and provide a streamlined transition. Therefore, the instructions may be transmitted according to a delay. The delay may be a predetermined amount of time from the trigger event to the transmission of the instructions. The delay may be based on the destination. Continuing the example from above, suppose the user 212 is playing a podcast in the vehicle 202, and the trigger event is the vehicle door 216 being opened, and the destination attributes include settings that the podcast be playing on the speaker 204. However, once the vehicle door 216 opens, it takes the user 212 five minutes to traverse two flights of stairs to the room having the speaker 204. The destination attributes may include a five minute delay, such that the control module 120 transmits the instructions for controlling the speaker 204 five minutes after the trigger event so that the user 212 does not miss five minutes of the podcast while traversing the stairs.

In another embodiment, the delay may be based on the proximity of the vehicle 202 to the destination. For example, the trigger event may be defined as the vehicle 202 being a threshold distance from the destination. Accordingly, the control module 120 may access the vehicle systems 122 and the vehicle sensors 124. For example, the control module 120 may access the navigation system 302 to determine the proximity of the vehicle 202 to the destination, such as the residence 200.

Additionally, the control module 120 may access the vehicle systems 122 and the vehicle sensors 124 to determine vehicle environmental attributes. Vehicle environmental attributes include environmental settings experienced by the user 212 in the vehicle 202. For example, if the user 212 is playing the podcast in the vehicle 202, a destination attribute may indicate the podcast is to be played from the point when the podcast was stopped in the vehicle 202. Accordingly, the control module 120 may access the vehicle audio system 308 to determine the timestamp from which the podcast should be played from by the speaker 204 in the second destination, the residence 200.

Figure 6:
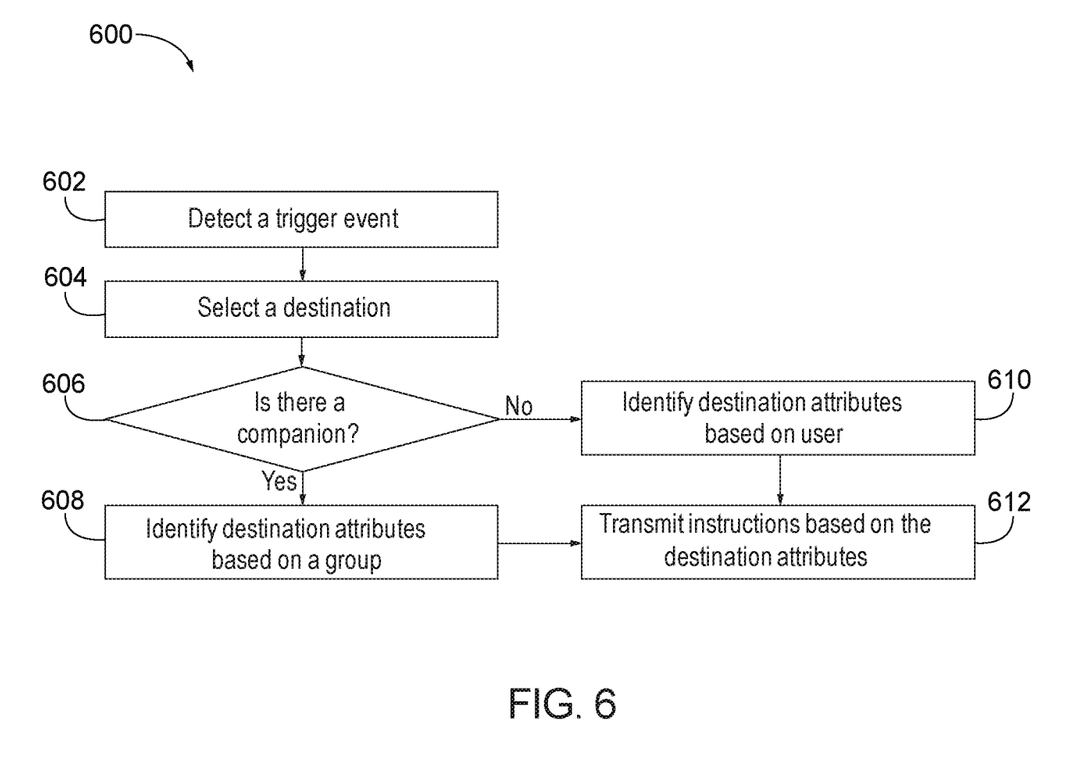
FIG. 6 is a process flow diagram of a method including a companion for vehicle communication for remote control according to an exemplary embodiment.

Referring now to FIG. 6, a method 600 associated with vehicle communication for remote control will be described according to an exemplary embodiment. FIG. 6 will be described with reference to FIGS. 1, 2, 4, and 5. As shown in FIG. 6, a method for vehicle communication for remote control with companions is provided. The illustrative examples discussed herein are exemplary in nature and varying users, vehicles, destinations, and destination attributes may be implemented.

With reference to FIG. 6, at block 602 the method 600 includes detecting a trigger event. Here the trigger event is detected prior to a destination being selected at block 604. However, detection of the trigger event, at block 602, and the destination being determined, at block 604, happen in a similar manner as described with respect to FIGS. 1 and 4.

The destination attributes and consequent remote control of the communicating devices may be affected by companions in the vehicle 202 or inhabitants of the destination. Therefore, at block 606 it is determined whether there is a companion 508 in the vehicle 202, as shown in FIG. 5. The companion 508 like the user 212, may be a biological being such as another human (e.g., adult, child, infant, etc.) or animal. The presence of the companion 508 may be determined by the vehicle systems 122 or the vehicle sensors 124. For example, the vehicle systems 122 may detect a companion 508 based on the safety system detecting a buckling of a seatbelt in a seat other than the driver's seat. Additionally, or alternatively, the detection of a companion 508 may be based on physiological data sensed by the vehicle sensors 124. The companion 508 may be identified in a similar manner as the user 212 could be identified, as described above. In one embodiment, the vehicle sensors 124 may detect the identity of the companion by comparing sensed physiological data to normative or baseline data. For example, suppose companions include members of the user's family. The companion 508 may be identified as the spouse of the user 212 based on the physiological data and vehicle data detected by the vehicle sensors 124.

If the companion 508 is in the vehicle 202 the user 212 and the companion 508 form a group, and the method 600 moves to block 608. At block 608, destination attributes associated with the group are identified. The group may have different preferences than the user 212 alone, and accordingly, have different destination attributes. For example, the user may wish to listen to news programming when alone, but listen to child-friendly music when a companion 508 is in the vehicle 202. Therefore, the destination attributes associated with the group may have a setting for playing child-friendly music on the speaker 204. Therefore, destination attributes may not only reflect the preferences of the user alone, but also the user with one or more companions.

Returning to block 606, if the companion 508 is not in the vehicle 202, the method 600 moves to block 610. At block 610, destination attributes associated with the user 212 are identified. The destination attributes associated with the user 212 may be user-specific.

At block 612 the method 600 includes transmitting instructions associated with the destination attributes based on either the group or the user 212 associated with the at least one destination. For example, the control module 120 may transmit instructions for controlling one or more remote systems at the destination corresponding to the destination attributes based on either the group or the user 212. In one embodiment, the instructions may be transmitted a predetermined amount of time after the trigger event based on the inhabitant being present at the destination. For example, the user 212 may delay the transmission of the instructions by the predetermined amount of time to afford the user 212 sufficient time to make their presence at the destination known to the inhabitant 214. Therefore, the predetermined amount of time is based on at least one being, such as the inhabitant 214, being located at the destination. In another embodiment, the destination attributes may include a message for the inhabitant 214. In this manner, the destination can be ready to accommodate the user 212 but also a group including one or more companions of the user 212.

Figure 7:
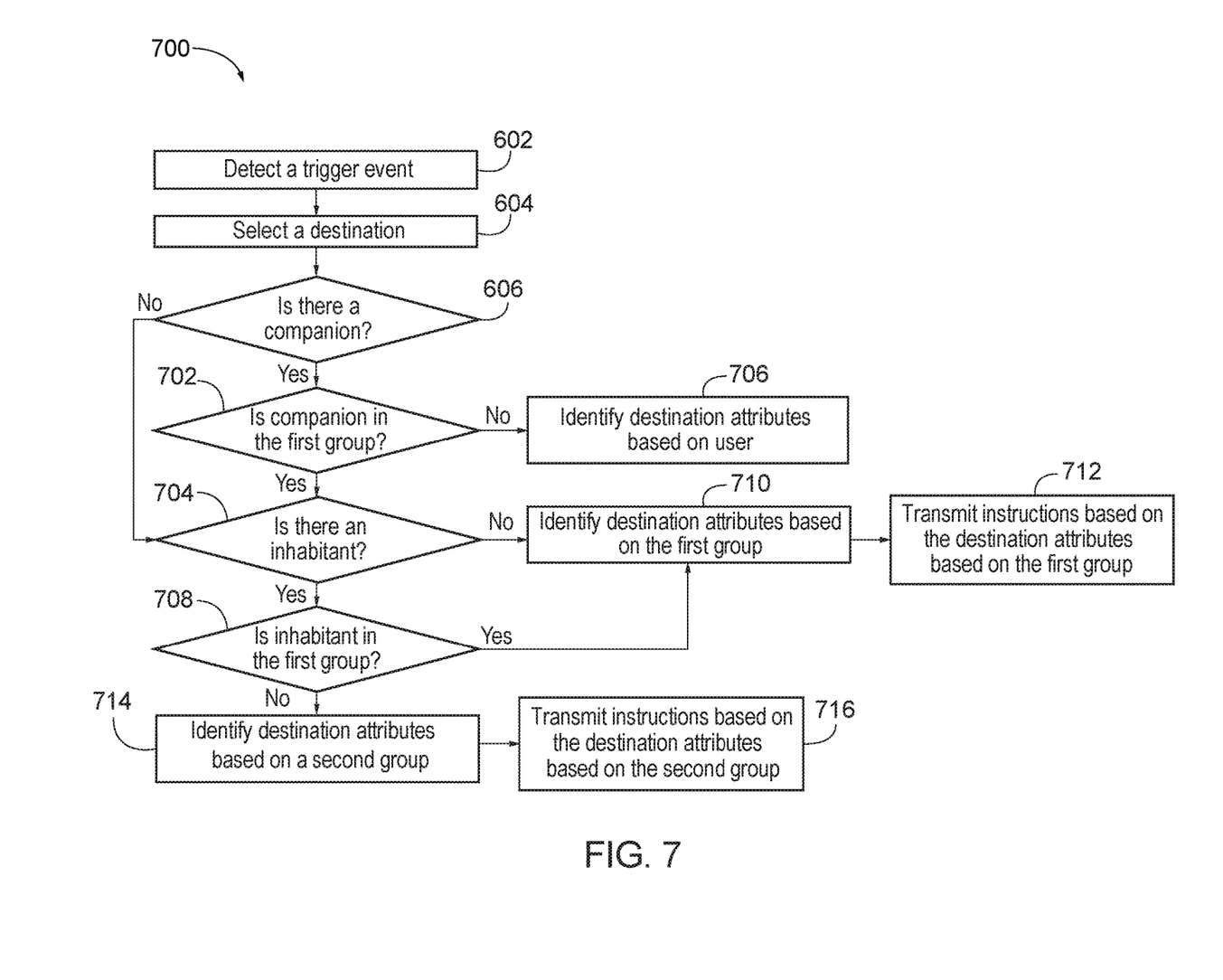
FIG. 7 is a process flow diagram of a method including an inhabitant for vehicle communication for remote control according to an exemplary embodiment.

FIG. 7 is a process flow diagram of a method including an inhabitant for vehicle communication for remote control according to an exemplary embodiment. FIG. 7 will be described with reference to FIGS. 1, 2, and 4-6. The illustrative examples discussed herein are exemplary in nature and varying users, vehicles, destinations, and destination attributes may be implemented. As discussed above, communicating devices at a destination can be controlled remotely to desired settings based on the arrival of the user 212 or a group. Additionally or alternatively, the communicating devices of the destination can be remotely controlled when an inhabitant 214 of the destination is present.

With reference to FIG. 7, at block 602 the method 700 includes detecting a trigger event. Here the trigger event is detected prior to a destination being selected at block 604. At block 606, it is determined whether a companion is in the vehicle 202. The detection of the trigger event, at block 602, the destination being determined, at block 604, and the determination of whether the companion 508 is in the vehicle 202, at block 606, happen in a similar manner as described with respect to blocks 602, 604, and 606 of FIG. 6.

If the companion 508 is in the vehicle 202 at block 606, the method 700 moves to block 702. At block 702, it is determined whether the companion 508 is a member of a first group. The members of the first group may be identified based on the location of the vehicle 202, the selected destination, the time of day, the day of the week, user data, vehicle data, and/or an identification of the companion 508. The first group may be based on the user 212 being accompanied by someone in the vehicle 202.

If the companion 508 is not a member of the first group at block 702, the method 700 moves to block 706. At block 706, destination attributes associated with the user 212 are identified. As discussed above, the destination attributes associated with the user 212 may reflect the preferences of the user 212 when the user 212 is alone.

If the companion is a member of the first group at block 702, the method 700 moves to block 704, at block 704 it is determined whether there is an inhabitant 214 at the destination. As discussed above with respect to FIG. 2, the inhabitant 214 may be anyone currently located at the destination. The inhabitant 214 may be detected using the remote communicating devices at the destination or sensors (not shown) associated with the remote computing device 128.

Returning to block 606, if the companion 508 is not in the vehicle 202, the method 700 also moves to block 704, and it is determined if there is an inhabitant 214 at the destination. If there is no inhabitant 214 at the destination, then the method moves to block 710. At block 710, destination attributes are identified based on the first group. The first group may have destination attributes for the user 212 and one or more companions. For example, as discussed above with respect to FIG. 6, the group may have different preferences than the user 212 alone, which are reflected by different destination attributes. From block 710, the method 700 continues to block 712. At block 712, the instructions based on the destination attributes associated with the first group are transmitted to the remote computing device 128.

Returning to block 704, if there is an inhabitant 214 in the at the destination the method 700 moves to block 708. At block 708 it is determined whether the inhabitant 214 is a member of a second group. The second group may be associated with a different set of destination attributes or a subset of destination attributes than that of the first group. For example, the first group may have destination attributes reflective of each of the members being an adult whereas the second group may include children, who are associated with different preferences, and thus different destination attributes.

If the inhabitant 214 is a member of the first group, then the method 700 returns to block 710 and destination attributes are identified based on the first group. Conversely, if at block 708, it is determined that the inhabitant 214 is not in the first group, then the method 700 moves to block 714. At block 714 the destination attributes are identified based on a second group. The second group may have a different but overlapping membership with the first group. Accordingly, the destination attributes may be tailored to the different membership of the second group. From block 714, the method 700 continues to block 716. At block 716, the instructions based on the destination attributes associated with the second group are transmitted to the remote computing device 128. Thus, the remote control of the communicating devices can be based on the user 212, as well as one or more companions and/or one or more inhabitants of the destination. The remote control of the communicating device through the remote systems 134 is facilitated by the vehicle 202, which communicates with the remote computing devices. Accordingly, the vehicle 202 facilitates the transition of the user 212 and the one or more companions between the vehicle 202 and the destination which may have one or more inhabitants.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for vehicle communication for remote control, the method comprising:
   selecting a destination based on user data associated with a user of a vehicle;
   identifying one or more destination attributes associated with the destination;
   detecting the user has entered or exited the vehicle based on vehicle data received from one or more of vehicle systems or vehicle sensors of the vehicle; and
   transmitting instructions for controlling one or more remote systems at the destination based on the one or more destination attributes in response to detecting the user has entered or exited the vehicle.

2. The computer-implemented method of claim 1, further comprising:
   identifying at least one companion of the user located in the vehicle based on the vehicle data; and
   determining that the at least one companion is a member of a group associated with the destination.

3. The computer-implemented method of claim 2, further comprising:
- identifying at least one inhabitant of the destination; and
- determining that the at least one inhabitant is a member of the group associated with the destination.

4. The computer-implemented method of claim 1, wherein the user data includes one or more of historical data, user patterns, and trend analysis.

5. The computer-implemented method of claim 1, wherein transmitting the instructions is delayed by a predetermined amount of time.

6. The computer-implemented method of claim 5, wherein the predetermined amount of time is based on at least one inhabitant being located in the destination.

7. The computer-implemented method of claim 5, wherein the predetermined amount of time is based on the destination.

8. The computer-implemented method of claim 1, wherein the one or more destination attributes are based on one or more vehicle environmental attributes.

9. The computer-implemented method of claim 1, wherein the destination is a residence and the destination attributes include one or more of lighting settings, audio settings, appliance settings, and temperature settings.

10. The computer-implemented method of claim 1, wherein detecting that the user has entered or exited the vehicle is based on opening a door of the vehicle.

11. A system for vehicle communication for remote control, the system comprising:
- a destination module configured to select a first destination and a second destination based on user data associated with a user of a vehicle;
- an environmental module configured to identify a first set of destination attributes associated with the first destination and a second set of destination attributes associated with the second destination;
- a trigger event module configured to detect that the user has entered or exited the vehicle based on vehicle data received from one or more of vehicle systems or vehicle sensors of the vehicle; and
- a control module configured to transmit a first set of instructions for controlling one or more remote systems at the first destination based on the first set of destination attributes at a first time in response to detecting that the user has entered or exited the vehicle; and transmitting a second set of instructions for controlling one or more remote systems at the second destination based on the second set of destination attributes at a second time after the first time.

12. The system of claim 11, wherein the first destination is a residence and the second destination is different than the first destination.

13. The system of claim 11, wherein the first time is approximately simultaneous with detecting that the user has entered or exited the vehicle and the second time occurs when the vehicle enters an autonomous driving mode.

14. The system of claim 11, wherein the control module is configured to identify that a first inhabitant is located in the first destination, and wherein the first set of destination attributes includes at least a first message for the first inhabitant at the first destination.

15. The system of claim 11, wherein the destination module is further configured to:
- identify at least one companion of the user based on the vehicle data; and
- determine that the at least one companion is a member of a group associated with the first destination and the second destination.

16. The system of claim 15, wherein the control module is further configured to alter the first set of instructions or the second set of instructions based on the group.

17. A non-transitory computer-readable storage medium storing instructions that, when executed by a computer, causes the computer to perform a method comprising:
- selecting a first destination and a second destination based on user data associated with a user of a vehicle;
- identifying a first set of destination attributes associated with the first destination and a second set of destination attributes associated with the second destination;
- detecting that the user has entered or exited the vehicle based on vehicle data received from one or more of vehicle systems or vehicle sensors of the vehicle;
- transmitting a first set of instructions for controlling one or more remote systems at the first destination based on the first set of destination attributes at a first time in response to detecting that the user has entered or exited the vehicle; and
- transmitting a second set of instructions for controlling one or more remote systems at the second destination based on the second set of destination attributes at a second time after the first time.

18. The non-transitory computer-readable storage medium of claim 17, wherein the first destination is a residence and the second destination is different than the first destination.

19. The non-transitory computer-readable storage medium of claim 17, wherein the first time is approximately simultaneous with detecting that the user has entered or exited the vehicle and the second time occurs when the vehicle enters an autonomous driving mode.

20. The non-transitory computer-readable storage medium of claim 17, wherein the user data includes one or more of historical data, user patterns, and trend analysis.

* * * * *